United States Patent
Fujita et al.

(10) Patent No.: US 10,897,052 B2
(45) Date of Patent: Jan. 19, 2021

(54) FUEL CELL SYSTEM HAVING HEATING UNIT TO RELEASE SOLID-SOLVED HYDROGEN FROM PRESSURE SENSOR

(71) Applicant: TOYOTA JIDOSHA KABUSHIKI KAISHA, Toyota (JP)

(72) Inventors: Keisuke Fujita, Susono (JP); Masayuki Ito, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 125 days.

(21) Appl. No.: 15/914,459

(22) Filed: Mar. 7, 2018

(65) Prior Publication Data
US 2018/0269502 A1   Sep. 20, 2018

(30) Foreign Application Priority Data

Mar. 15, 2017 (JP) .................. 2017-050479

(51) Int. Cl.
*H01M 8/04082* (2016.01)
*H01M 8/0438* (2016.01)
*H01M 8/04701* (2016.01)

(52) U.S. Cl.
CPC ... *H01M 8/04201* (2013.01); *H01M 8/04388* (2013.01); *H01M 8/04738* (2013.01); *H01M 2250/20* (2013.01); *Y02T 90/40* (2013.01)

(58) Field of Classification Search
CPC ......... H01M 8/04201; H01M 8/04388; H01M 8/04738
USPC .................................................. 429/428, 442
See application file for complete search history.

(56) References Cited

U.S. PATENT DOCUMENTS

| | | | |
|---|---|---|---|
| 2006/0051636 A1* | 3/2006 | Kubo | H01M 8/04097 429/429 |
| 2014/0147760 A1* | 5/2014 | Ohgami | H01M 8/04097 429/415 |

FOREIGN PATENT DOCUMENTS

| | | | | |
|---|---|---|---|---|
| JP | 2005164538 A | * | 6/2005 | |
| JP | 2005268179 A | * | 9/2005 | |
| JP | 2005353454 A | * | 12/2005 | |
| JP | 2006-209994 A | | 8/2006 | |
| JP | 2009059573 A | | 3/2009 | |
| JP | 2011002393 A | * | 1/2011 | |
| JP | 2011002393 A | | 1/2011 | |
| JP | 2011204411 A | * | 10/2011 | |
| JP | 2013-177910 A | | 9/2013 | |
| JP | 2014-175056 A | | 9/2014 | |

* cited by examiner

*Primary Examiner* — Sean P Cullen
(74) *Attorney, Agent, or Firm* — Hunton Andrews Kurth LLP

(57) ABSTRACT

Provided is a fuel cell system including: a fuel cell; a tank that stores a fuel gas; a supply passage through which the fuel gas is supplied from the tank to the fuel cell; a first valve and a second valve that open and close the supply passage and are provided in order of the first valve, the second valve in a direction from an upstream side toward a downstream side; a pressure sensor that detects a pressure in a detection target region that is a region of the supply passage between the first valve and the second valve; a heating unit that heats the pressure sensor; and a controller that makes the heating unit heat the pressure sensor in a state in which a detection value of the pressure sensor is not larger than a predetermined threshold value.

3 Claims, 12 Drawing Sheets

FUEL CELL SYSTEM HAVING HEATING UNIT TO RELEASE SOLID-SOLVED HYDROGEN FROM PRESSURE SENSOR

INCORPORATION BY REFERENCE

The disclosure of Japanese Patent Application No. 2017-050479 filed on Mar. 15, 2017 including the specification, drawings and abstract is incorporated herein by reference in its entirety.

BACKGROUND

1. Technical Field

The present disclosure relates to a fuel cell system.

2. Description of Related Art

A fuel cell system in which a fuel gas is supplied from inside a tank to a fuel cell through a supply passage is known. In some cases, two valves are provided in this supply passage, on an upstream side and a downstream side relative to each other, and a pressure sensor is provided in the supply passage between the two valves (e.g., see Japanese Patent Application Publication No. 2013-177910).

SUMMARY

The pressure in the supply passage between the two valves tends to reach a relatively high pressure. That is to say, when the valve on the upstream side opens while the valve on the downstream side is closed, the fuel gas that is stored under high pressure in the tank fills the supply passage between the two valves, thus building up a pressure in the supply passage. Therefore, a pressure sensor that detects the pressure in such a space is exposed to the high-pressure fuel gas. A possible result is that components of the fuel gas are solid-solved in the pressure sensor and reduce the detection accuracy of the pressure sensor.

The present disclosure provides a fuel cell system that can recover the detection accuracy of a pressure sensor.

A fuel cell system according to the present disclosure includes: a fuel cell; a tank configured to store a fuel gas; a supply passage configured so that the fuel gas is supplied through the supply passage from the tank to the fuel cell; a first valve configured to open and close the supply passage; a second valve configured to open and close the supply passage, the first valve and the second valve being provided in order of the first valve, the second valve in a direction from an upstream side toward a downstream side; a pressure sensor configured to detect a pressure in a detection target region that is a region of the supply passage between the first valve and the second valve; a heating unit configured to heat the pressure sensor; and a controller configured to make the heating unit heat the pressure sensor in a state in which a detection value of the pressure sensor is not larger than a predetermined threshold value.

Heating the pressure sensor in a low-pressure environment where the detection value of the pressure sensor is not larger than the predetermined threshold value can promote the release of components of the fuel gas solid-solved in the pressure sensor from the pressure sensor. Thus, the reduced detection accuracy of the pressure sensor can be recovered.

The controller may be configured to make the heating unit heat the pressure sensor in a state in which the detection value is not larger than the predetermined threshold value and the first valve is closed.

The fuel cell system may further include an injector provided in the supply passage, farther on the downstream side than the second valve, and configured to inject the fuel gas to the downstream side. The controller may be configured to control the detection value so as not to be larger than the predetermined threshold value, by making the injector inject the fuel gas in a state in which the first valve is closed and the second valve is open.

The fuel cell system may further include: a bypass passage that has a relay region in which a pressure is detectable by the pressure sensor, and provides communication between the detection target region and outside air; and a switching mechanism configured to switch between a first state in which the relay region communicates with the detection target region while isolated from the outside air and a second state in which the relay region is isolated from the detection target region while communicating with the outside air. The pressure sensor may be configured to detect the pressure in the detection target region through the relay region, and the controller may be configured to make the heating unit heat the pressure sensor in a state in which the detection value is not larger than the predetermined threshold value and the fuel cell system is in the second state.

The fuel cell system may further include: a bypass passage that has a relay region in which a pressure is detectable by the pressure sensor, and provides communication between the detection target region and a downstream region of the supply passage located farther on the downstream side than the second valve; and a switching mechanism configured to switch between a first state in which the relay region communicates with the detection target region while isolated from the downstream region and a second state in which the relay region is isolated from the detection target region while communicating with the downstream region. The pressure sensor may be configured to be able to detect the pressure in the detection target region through the relay region, and the controller may be configured to make the heating unit heat the pressure sensor in a state in which the detection value is not larger than the predetermined threshold value and the fuel cell system is in the second state.

The fuel cell system may further include an injector provided in the bypass passage, farther on the downstream side than the switching mechanism, and configured to inject the fuel gas to the downstream side. The controller may be configured to control the detection value so as not to be larger than the predetermined threshold value by making the injector inject the fuel gas in the second state.

The present disclosure can provide a fuel cell system that can recover the detection accuracy of a pressure sensor.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
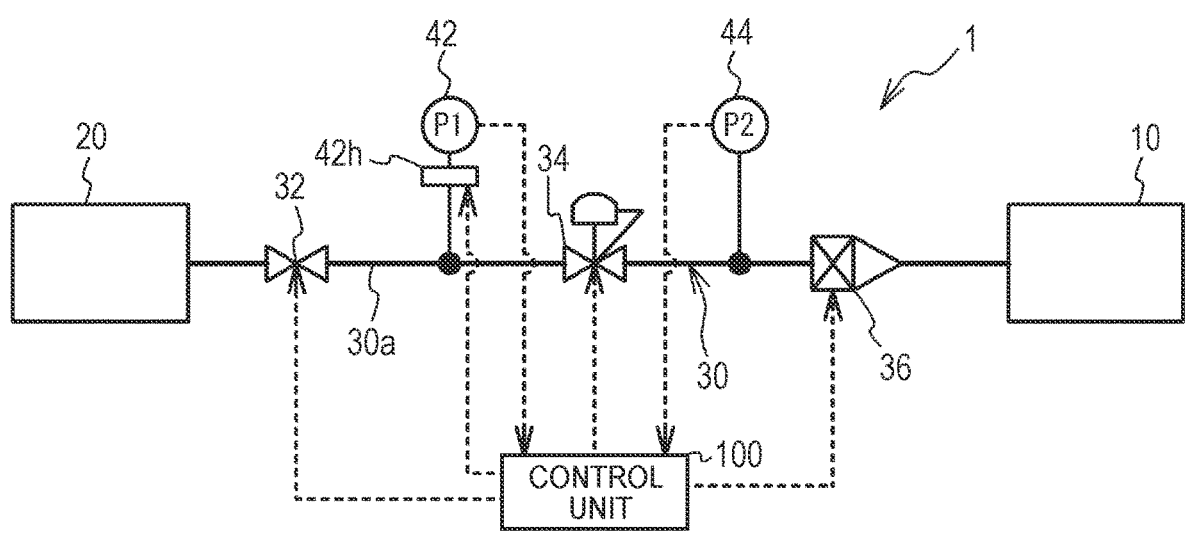
FIG. 1 is a view illustrating a fuel gas supply line of a fuel cell system in an embodiment.

FIG. 1 is a view illustrating a fuel gas supply line of a fuel cell system 1 in an embodiment. The fuel cell system 1 includes a fuel cell 10, a tank 20, a supply passage 30, a main stop valve 32, a pressure reducing valve 34, an injector 36, pressure sensors 42, 44, etc. The fuel cell 10 has a stack structure in which a plurality of single cells are stacked, and is supplied with a fuel gas and an oxidant gas to generate electric power by electrochemical reactions between the fuel gas and the oxidant gas. A hydrogen gas that is the fuel gas supplied to the fuel cell 10 is stored under high pressure in the tank 20. The supply passage 30 connects the fuel cell 10 and the tank 20 to each other, and the fuel gas is supplied from the tank 20 to the fuel cell 10 through the supply passage 30. The fuel gas and the oxidant gas are supplied to the fuel cell 10 as a control unit 100 controls operations of the relevant devices.

The fuel cell system 1 is provided with an exhaust passage through which the fuel gas is discharged into outside air, a coolant supply passage through which a coolant is supplied to the fuel cell 10, and various components such as auxiliary devices. In this embodiment, the fuel cell system 1 is installed in a vehicle, and the fuel cell 10 supplies electric power to a traction motor of the vehicle.

The main stop valve 32, the pressure reducing valve 34, and the injector 36 are provided in the supply passage 30, in order of the main stop valve 32, the pressure reducing valve 34, the injector 36, in a direction from an upstream side toward a downstream side. The main stop valve 32 controls inflow of the fuel gas from the tank 20 toward the upstream side of the supply passage 30. The pressure reducing valve 34 is a pressure reducing valve that adjusts the pressure of the fuel gas on the upstream side of the supply passage 30 to a set low pressure. In this embodiment, the main stop valve 32 and the pressure reducing valve 34 are respectively examples of the "first valve" and the "second valve" that are provided in order of the "first valve" and the "second valve" in the direction from the upstream side toward the downstream side. The main stop valve 32 opens and closes the supply passage 30. The pressure reducing valve 34 half opens when the surrounding pressure is high and fully opens when the surrounding pressure is low. The injector 36 is an electromagnetically driven injector that injects the fuel gas to the downstream side of the supply passage 30. The region of the supply passage 30 between the main stop valve 32 and the pressure reducing valve 34 will be referred to as a detection target region 30a.

The pressure sensor 42 is provided in the detection target region 30a, and detects the gas pressure of the fuel gas discharged from the main stop valve 32. The pressure sensor 42 is provided with a heating element 42h as will be described in detail later. The pressure sensor 44 is provided in the supply passage 30 between the pressure reducing valve 34 and the injector 36, and detects the pressure of the fuel gas that has been reduced by the pressure reducing valve 34.

The control unit 100 is formed by a computer including a central processing unit (CPU), a random access memory (RAM), a read only memory (ROM), a storage device, etc. The control unit 100 corresponds to the "controller" that executes various processes and controls by controlling the main stop valve 32, the pressure reducing valve 34, the injector 36, and the heating element 42h based on detection values of the pressure sensors 42, 44 etc.

Figure 2:
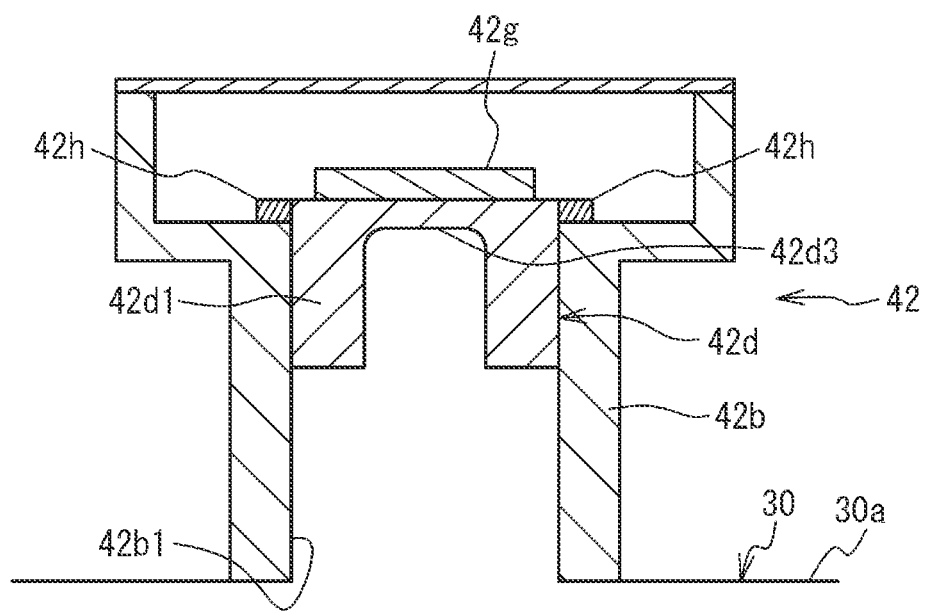
FIG. 2 is a schematic sectional view of a pressure sensor.

FIG. 2 is a schematic sectional view of the pressure sensor 42. The pressure sensor 42 includes a body 42b, a diaphragm 42d, a strain gauge 42g, and the heating element 42h. The body 42b is made of metal and has a substantially cylindrical shape, and houses the diaphragm 42d, the strain gauge 42g, and the heating element 42h. An open end 42b1 of the body 42b on a leading end side is inserted into an outer wall in the detection target region 30a. The diaphragm 42d is made of metal, such as stainless steel, and includes a cylindrical part 42d1, and a thin-walled pressure receiving part 42d3 that is integrated in the cylindrical part 42d1 and closes an end of the cylindrical part 42d1 on the upper side in FIG. 2. The pressure receiving part 42d3 undergoes distortion according to the pressure of the fuel gas introduced into the cylindrical part 42d1.

Four strain gauges 42g are provided on an outer surface of the pressure receiving part 42d3. A stress applied to each strain gauge 42g changes according to the deflection of the pressure receiving part 42d3, and the resistance of the strain gauge 42g changes accordingly. With this change in a resistance value used as a differential output of a bridge circuit, an output proportional to the pressure of the fuel gas can be obtained. The heating element 42h is provided in the vicinity of the diaphragm 42d and the strain gauges 42g. Energization of the heating element 42h is controlled by the control unit 100, and the diaphragm 42d is heated as the heating element 42h is energized.

Here, a metal material is used for the diaphragm 42d. Therefore, when the diaphragm 42d is exposed to the high-pressure fuel gas, hydrogen, which is a component of the fuel gas, may be solid-solved in this metal material. As a result, error of the detection value of the pressure sensor 42 may increase, and the detection accuracy may be reduced.

Figure 3A:
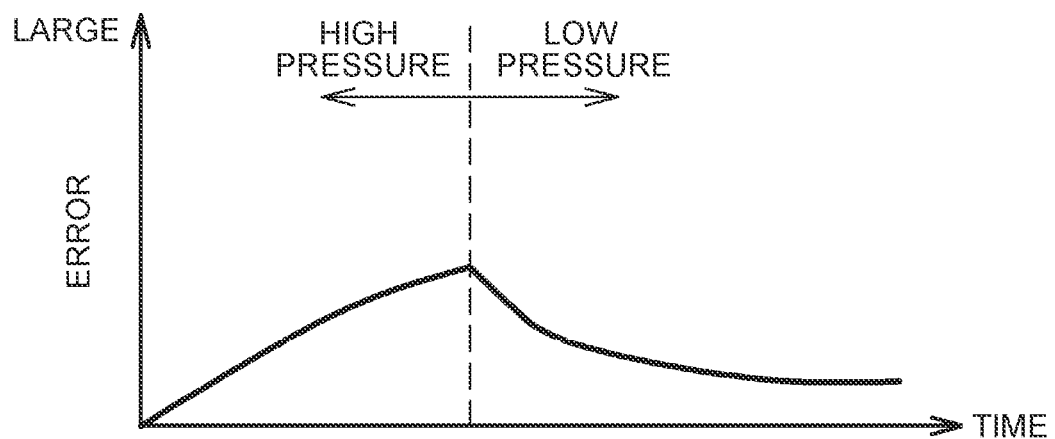
FIG. 3A is a graph showing changes over time in error of a detection value of the pressure sensor.

FIG. 3A is a graph showing changes over time in error of the detection value of the pressure sensor 42. This graph shows changes in the error of the detection value of the pressure sensor 42 in a case where first a high-pressure fuel gas environment and then a low-pressure fuel gas environment were created around the pressure sensor 42. As shown in FIG. 3A, in the high-pressure fuel gas environment, the error increases gradually as time passes. In the subsequent low-pressure fuel gas environment, by contrast, the error decreases gradually. A possible explanation for this result is that the high-pressure environment promotes solid solution of hydrogen in the metal material of the pressure sensor 42 more than the low-pressure environment, and that the low-pressure environment causes the release of the hydrogen solid-solved in the metal material of the pressure sensor 42.

Figure 3B:
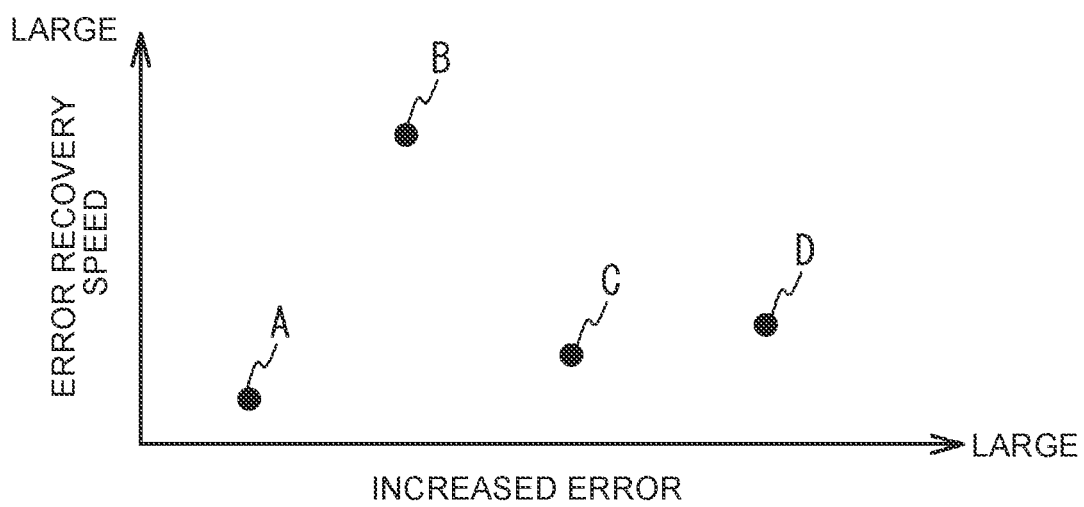
FIG. 3B is a graph showing an error recovery speed in four samples of the pressure sensor.

FIG. 3B is a graph showing an error recovery speed in four samples A to D of the pressure sensor 42. These samples A to D were placed in advance in a high-pressure fuel gas environment so as to increase the error. The error was larger in order of the samples A to D. The samples A, C, and D were placed in a low-pressure fuel gas environment. The sample B was heated while placed in a low-pressure fuel gas environment. As a result, the sample B that was heated in a low-pressure fuel gas environment recorded the highest recovery speed. In this embodiment, the control unit 100 executes recovery control of recovering the detection accuracy of the pressure sensor 42 by making the heating element 42h heat the pressure sensor 42 in a low-pressure environment.

Figure 4:
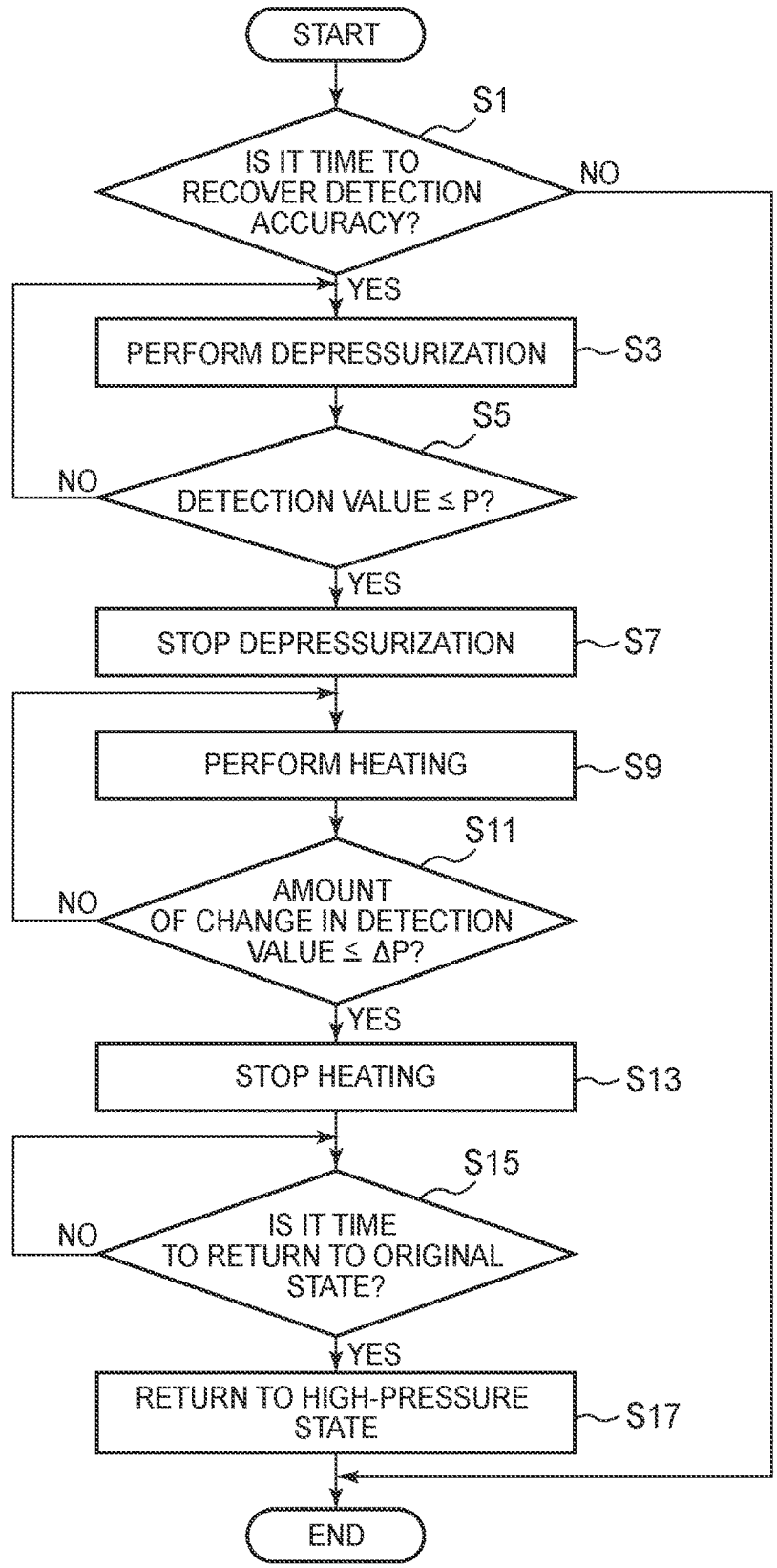
FIG. 4 is an example of a flowchart of recovery control in the embodiment.

FIG. 4 is an example of a flowchart of the recovery control in this embodiment. The control unit 100 repeatedly executes this control in predetermined cycles. First, it is determined whether it is time to recover the detection accuracy of the pressure sensor 42 (step S1). When the determination is negative, the current control is ended. This negative determination is made when a recovery request flag is on and turning off of the ignition of the vehicle is detected. Ignition turn-off is detected based on an output signal from an ignition switch. The recovery request flag is switched from off to on when a travel distance of the vehicle reaches or exceeds a predetermined threshold value, or when a time elapsing since the last execution of the recovery control reaches or exceeds a predetermined threshold value.

These predetermined threshold values may be corrected so as to be smaller when a period during which the outside air temperature while the vehicle is travelling is at or above a predetermined value is longer, or when a period during which the detection value of the pressure sensor 42 is at or above a predetermined value is longer. This is because solid solution is further promoted when the outside air temperature while the vehicle is travelling is higher, and a period during which the pressure sensor 42 is exposed to the high-pressure fuel gas is longer. In this case, a period during which a detection value of an outside air temperature sensor is at or above a predetermined value is stored in a memory of the control unit 100, or the period during which the detection value of the pressure sensor 42 is at or above the predetermined value is stored in the memory of the control unit 100.

When the determination in step S1 is affirmative, an inside of the detection target region 30a is depressurized (step S3). Specifically, the fuel gas is injected by the injector 36 in a state in which the main stop valve 32 is closed and the pressure reducing valve 34 is open, and thus the inside of the detection target region 30a is depressurized. As a result, the pressure around the pressure sensor 42 decreases. Meanwhile, the fuel gas and the oxidant gas inside the system are discharged to an outside, so that the fuel cell 10 stops generating electric power.

Next, it is determined whether the detection value of the pressure sensor 42 has decreased to or below a threshold value P (step S5). When the determination is negative, depressurization is continued. When the determination is affirmative, depressurization is stopped (step S7). Specifically, injection of the fuel gas by the injector 36 is also stopped. Thus, the inside of the detection target region 30a is maintained in a predetermined depressurized state.

Next, the pressure sensor 42 is heated (step S9). Specifically, the heating element 42h is energized to heat the diaphragm 42d and the strain gauges 42g. Thus, these diaphragm 42d and strain gauges 42g are heated while the periphery of the pressure sensor 42 is in the depressurized state. In this way, it is possible to promote the release of hydrogen solid-solved in the metal material of the pressure sensor 42, and to quickly recover the detection accuracy of the pressure sensor 42.

Next, it is determined whether the amount of change in the detection value of the pressure sensor 42 over a predetermined time has decreased to or below a predetermined threshold value ΔP (step S11). The detection value of the pressure sensor 42 does not stabilize while the hydrogen solid-solved in the metal material of the pressure sensor 42 is being released to the surrounding area as the pressure sensor 42 is heated. Therefore, when the amount of change in the detection value of the pressure sensor 42 has decreased to or blow the predetermined threshold value ΔP, it is determined that the hydrogen solid-solved in the metal material has been sufficiently released. When the determination is negative, heating of the pressure sensor 42 is continued. As this determination is made with the main stop valve 32 closed, other factors than the release of hydrogen can be prevented from affecting the detection value of the pressure sensor 42, and thus the determination can be accurately made. Alternatively, it may be determined in step S11 whether the rate of change in the determination value of the pressure sensor 42 has decreased to or below a predetermined threshold value.

When the determination in step S11 is affirmative, heating of the pressure sensor 42 is stopped based on the assumption that the solid solute has been removed and that the detection accuracy of the pressure sensor 42 has recovered (step S13). The above-described recovery request flag is switched from on to off.

Next, it is determined whether it is time to return to the original state (step S15). Specifically, it is determined whether turning on of the ignition of the vehicle is detected. Ignition turn-on is detected based on an output signal from the ignition switch. When the determination is negative, the process in step S15 is executed again.

When the determination in step S15 is affirmative, the main stop valve 32 is opened to return the state of the inside of the detection target region 30a to the pre-depressurization high-pressure state (step S17). Thus, the fuel gas can be supplied to the fuel cell 10 through the pressure reducing valve 34 and the injector 36, and the fuel cell 10 can generate electric power.

Figure 5:
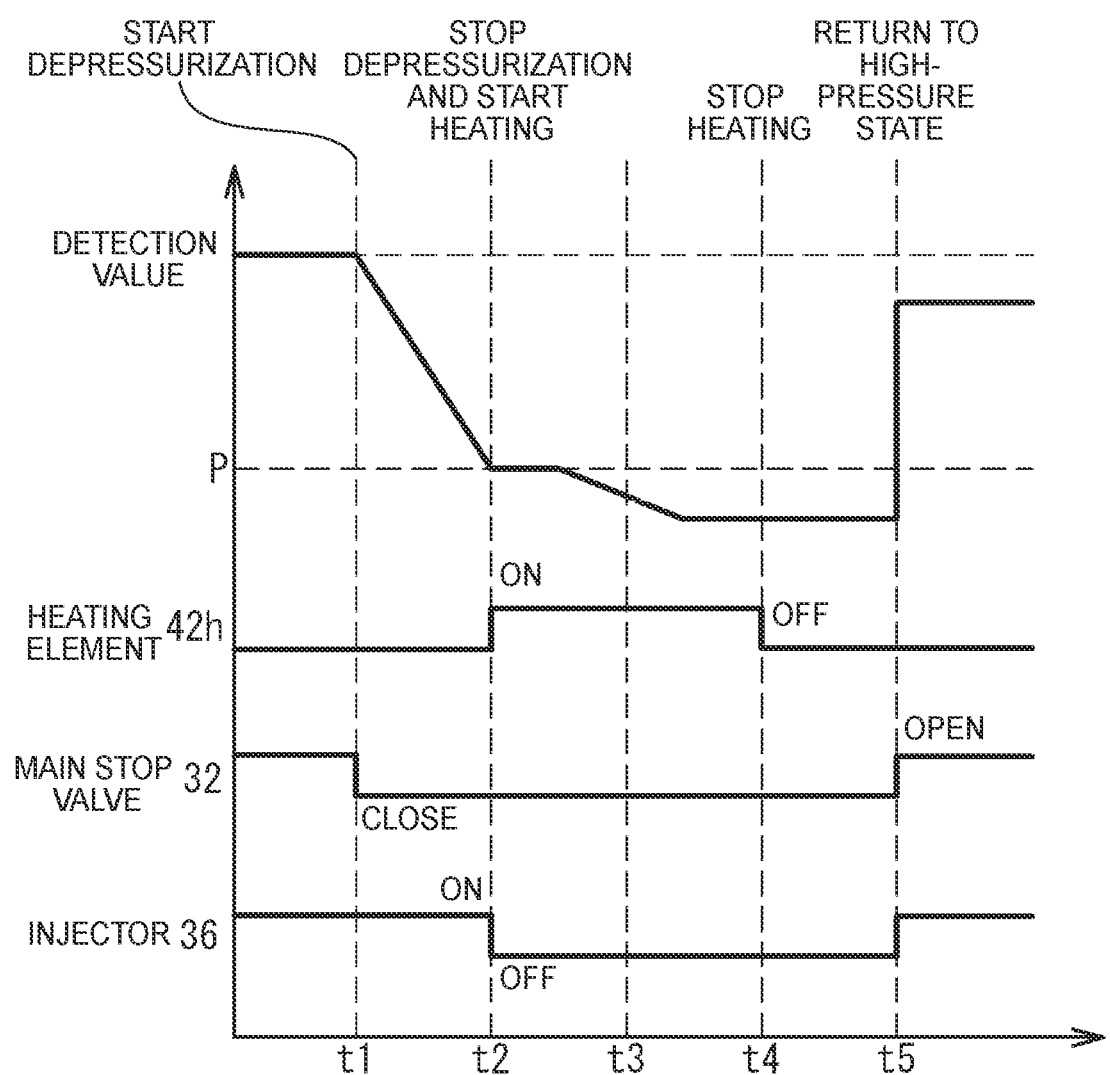
FIG. 5 is an example of a timing chart showing the recovery control in the embodiment.

FIG. 5 is an example of a timing chart showing the recovery control in this embodiment. When the recovery request flag is on and ignition turn-off is detected, at time t1, the main stop valve 32 is closed and the fuel gas is injected by the injector 36 to start depressurization. When the detection value of the pressure sensor 42 decreases to or below the threshold value P at time t2, injection by the injector 36 is stopped and heating of the pressure sensor 42 is started. Thus, at time t3, the amount of change in the detection value of the pressure sensor 42 fluctuates and becomes unstable. When the amount of change in the detection value of the pressure sensor 42 decreases to or below the threshold value ΔP at time t4, heating of the pressure sensor 42 is stopped. When ignition turn-on is detected at time t5, the main stop valve 32 is opened and the detection target region 30a returns to the original high-pressure state. The detection value of the pressure sensor 42 after time t5 is smaller than that before time t1. This is because, before time t1, the detection value of the main stop valve 32 is larger than the actual pressure value due to error, while after time t4, the error is eliminated and the detection value is almost equal to the actual pressure value. FIG. 5 illustrates the case where the injector 36 injects the fuel gas also before time t1 and the injector 36 injects the fuel gas immediately after time t5, but the present disclosure is not limited to this example.

As has been described above, when ignition turn-off is detected, the recovery control of the pressure sensor 42 is executed by closing the main stop valve 32. As long as the main stop valve 32 is closed, no additional fuel gas is supplied from the tank 20 to the fuel cell 10. Here, when ignition turn-off is detected, the fuel cell 10 stops generating electric power after a lapse of at least a predetermined period. Therefore, executing the recovery control by closing the main stop valve 32 and starting depressurization when the fuel cell 10 is expected to stop generating electric power can recover the detection accuracy of the pressure sensor 42 without affecting electric power generation by the fuel cell 10.

The present disclosure is not necessarily limited to the example in which the recovery control is executed when ignition turn-off is detected. For example, when the vehicle is in an operation state in which the amount of electric power stored in a secondary battery installed in the vehicle is at or above a predetermined value and the required amount of electric power generation by the fuel cell 10 is small, opening and closing of the main stop valve 32 etc. may be controlled and depressurization of the inside of the detection target region 30a may be started. In other words, on the condition that the vehicle is in an operation state in which depressurization of the inside of the detection target region 30a does not significantly affect the electric power generation by the fuel cell 10, the depressurization may be started and the recovery control of the pressure sensor 42 may be executed.

Next, fuel cell systems in modified examples will be described. Components and processes of the fuel cell systems in the modified examples that are the same as those in the above embodiment will be denoted by the same reference signs to omit overlapping descriptions.

Figure 6:
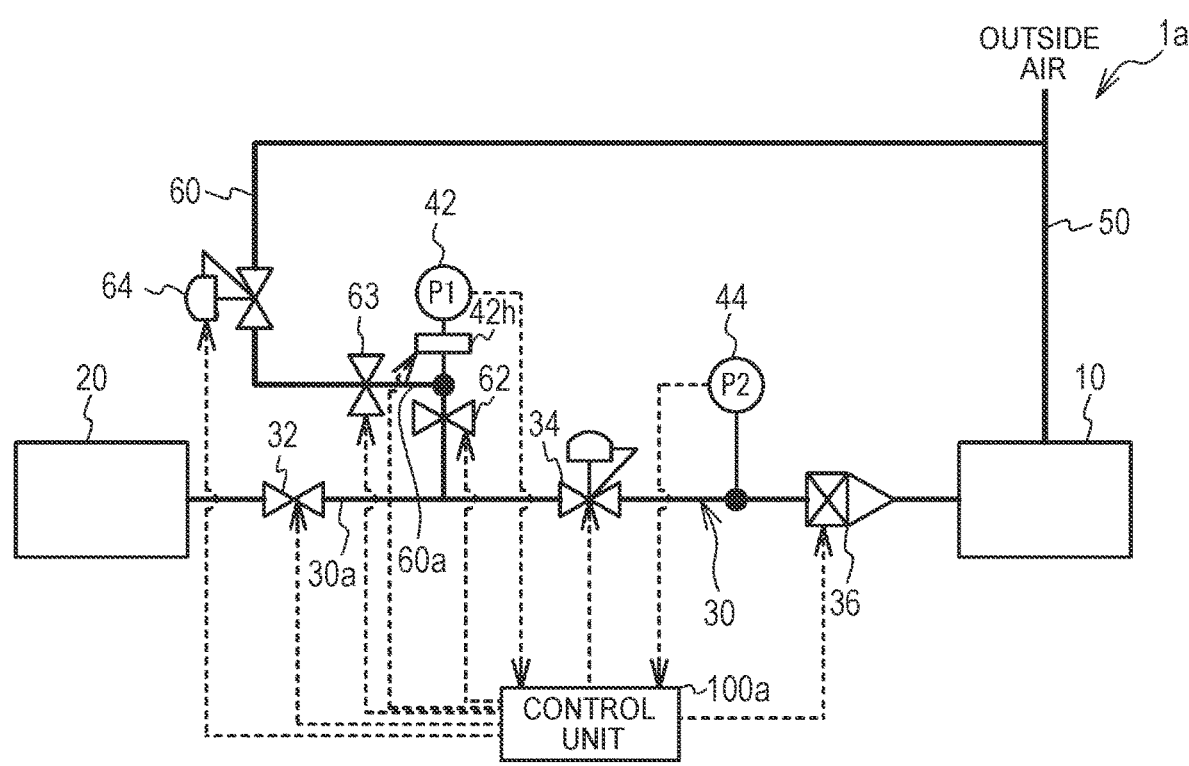
FIG. 6 is a view illustrating a fuel gas supply line of a fuel cell system in a first modified example.

FIG. 6 is a view illustrating a fuel gas supply line of a fuel cell system 1a in a first modified example. The fuel cell system 1a includes an exhaust passage 50, a bypass passage 60, an upstream shut-off valve 62, a downstream shut-off valve 63, and a pressure reducing valve 64. The exhaust passage 50 is a passage through which a fuel off-gas discharged from the fuel cell 10 is discharged into the outside air, and although this is not shown, the exhaust passage 50 is also provided in the fuel cell system 1. The bypass passage 60 communicates at one end with the detection target region 30a and at the other end with the exhaust passage 50. Accordingly, the bypass passage 60 communicates with the outside air through the exhaust passage 50. The upstream shut-off valve 62, the downstream shut-off valve 63, and the pressure reducing valve 64 are provided in the bypass passage 60, in order of the upstream shut-off valve 62, the downstream shut-off valve 63, the pressure reducing valve 64 in the direction from the upstream side toward the downstream side. The upstream shut-off valve 62, the downstream shut-off valve 63, and the pressure reducing valve 64 are controlled by a control unit 100a. The pressure sensor 42 is provided in the bypass passage 60 between the upstream shut-off valve 62 and the downstream shut-off valve 63. In the first modified example, the region of the bypass passage 60 between the upstream shut-off valve 62 and the downstream shut-off valve 63 will be referred to as a relay region 60a in which the pressure is detectable by the pressure sensor 42.

The upstream shut-off valve 62 and the downstream shut-off valve 63 are an example of the "switching mechanism" that switches between a first state in which the relay region 60a communicates with the detection target region 30a while isolated from the outside air and a second state in which the relay region 60a is isolated from the detection target region 30a while communicating with the outside air. Specifically, the first state is realized as the upstream shut-off valve 62 is opened and the downstream shut-off valve 63 is closed. The second state is realized as the upstream shut-off valve 62 is closed and the downstream shut-off valve 63 is opened. The pressure reducing valve 64 fully opens under a low pressure and half opens under a high pressure, and thus is open in both the first and second states.

In the first modified example, the fuel cell system is controlled to the first state when the recovery control is not being executed. Therefore, the pressure in the relay region 60a is equal to the pressure in the detection target region 30a, and the pressure sensor 42 can detect the pressure in the detection target region 30a through the relay region 60a. Since the downstream shut-off valve 63 is closed, the fuel off-gas is prevented from flowing through the exhaust passage 50 back into the bypass passage 60 and flowing into the supply passage 30.

Figure 7:
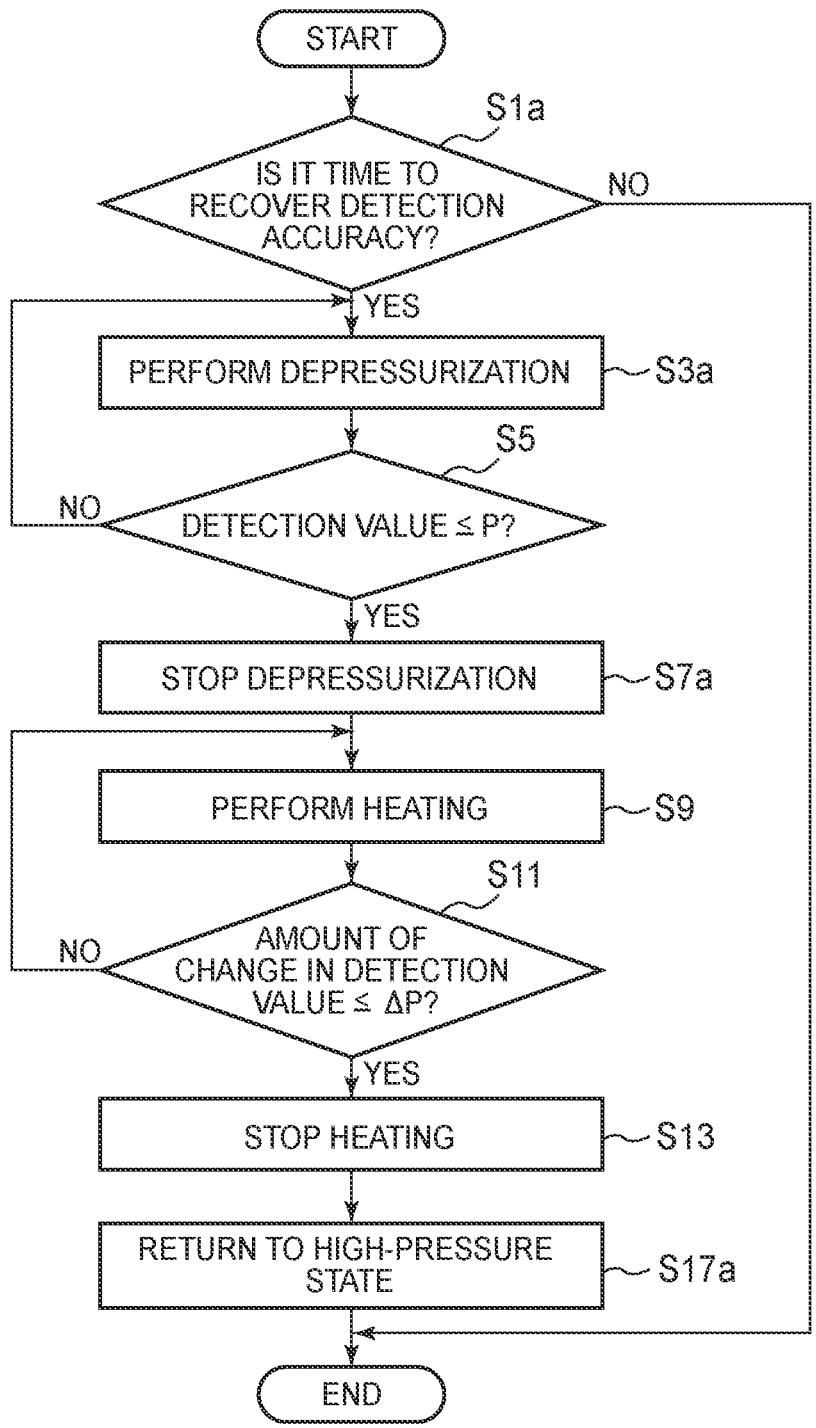
FIG. 7 is an example of a flowchart showing recovery control in the first modified example.

FIG. 7 is an example of a flowchart showing recovery control in the first modified example. The control unit 100a repeatedly executes this control in predetermined cycles. First, it is determined whether it is time to recover the detection accuracy of the pressure sensor 42 (step S1a). When the determination is negative, the current control is ended. Unlike in the above embodiment, this determination is affirmative when ignition turn-off is not detected and the recovery request flag of the pressure sensor 42 is on.

When the determination in step S1a is affirmative, the inside of the relay region 60a is depressurized (step S3a). Specifically, the fuel cell system is switched to the second state, and the fuel gas inside the relay region 60a is discharged into the outside air. Thus, the pressure in the relay region 60a decreases to substantially equal to the outside air pressure, and the periphery of the pressure sensor 42 is depressurized. As the upstream shut-off valve 62 is closed, a part of the bypass passage 60 on the downstream side from the upstream shut-off valve 62 and the detection target region 30a are isolated from each other. Therefore, even when depressurization is thus performed, the fuel gas can be continuously supplied from the tank 20 to the fuel cell 10 through the supply passage 30.

Next, when the determination in step S5 is affirmative, depressurization is stopped (S7a) as in the above embodiment. Specifically, the pressure reducing valve 64 is fully opened. Next, the processes in steps S9 to S13 are executed as in the above embodiment. When the process in step S13 is executed, the fuel cell system is switched to the first state, so that the pressure in the relay region 60a becomes equal to the pressure in the detection target region 30a, and the pressure in the relay region 60a is returned to the pre-depressurization high pressure (step S17a).

Thus, the recovery control of the pressure sensor 42 can be executed even while the fuel gas is continuously supplied from the tank 20 to the fuel cell 10. It is therefore possible, for example, to quickly recover the pressure sensor 42 from a reduction in detection accuracy even while the vehicle is travelling, and to appropriately control the fuel cell system 1a based on the detection value of the pressure sensor 42 with the recovered accuracy.

Figure 8:
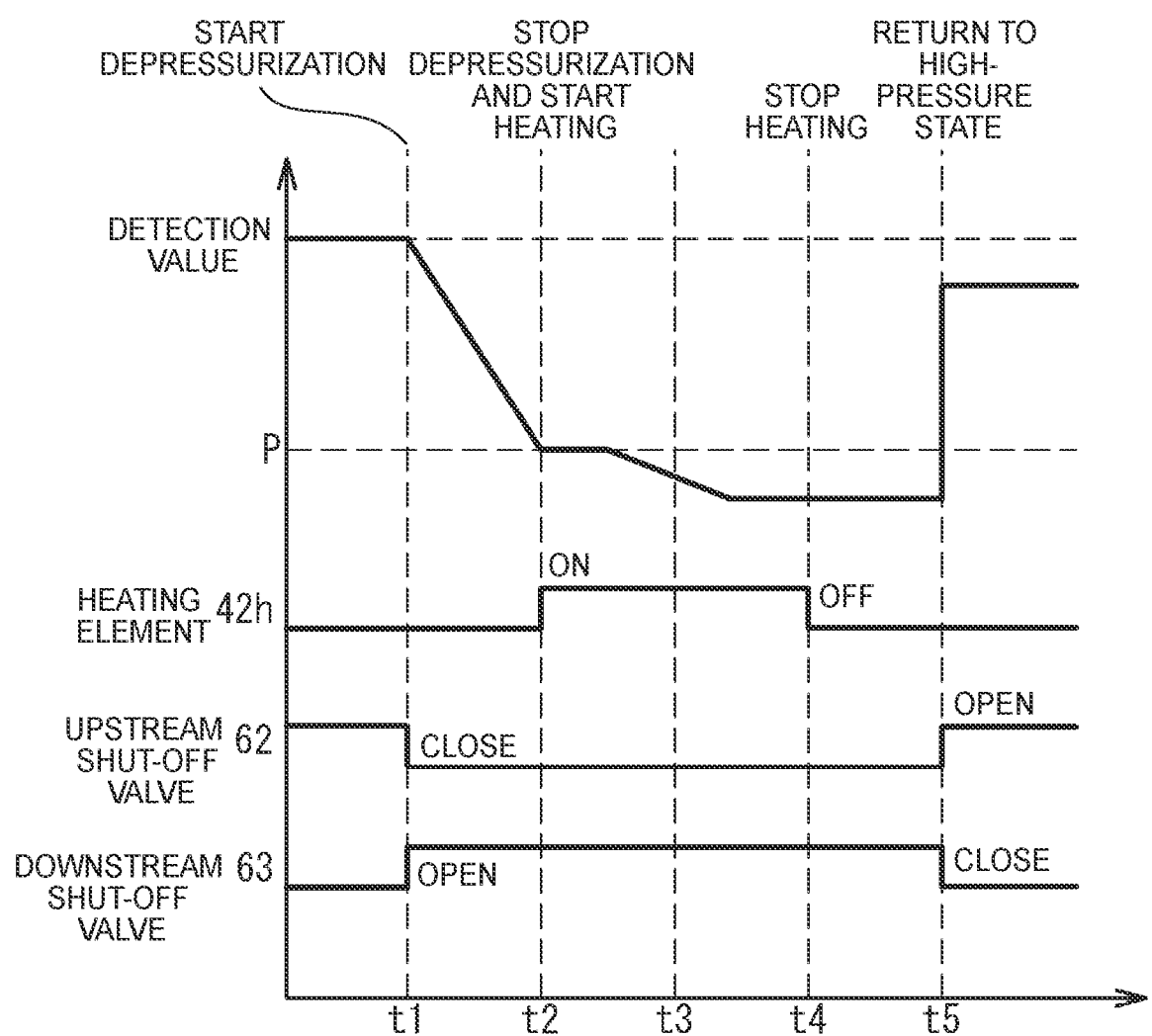
FIG. 8 is an example of a timing chart showing the recovery control in the first modified example.

FIG. 8 is an example of a timing chart showing the recovery control in the first modified example. When the recovery request flag is turned on, at time t1, the upstream shut-off valve 62 is closed and the downstream shut-off valve 63 is opened, and depressurization is started through the pressure reducing valve 64. When the detection value of the pressure sensor 42 decreases to or below the threshold value P at time t2, heating of the pressure sensor 42 is started. Thus, at time t3, the amount of change in the detection value of the pressure sensor 42 fluctuates and becomes unstable. When the amount of change in the detection value of the pressure sensor 42 decreases to or below the threshold value ΔP at time t4, heating of the pressure sensor 42 is stopped. Then, at time t5, the upstream shut-off valve 62 is opened and the downstream shut-off valve 63 is closed, so that the pressure in the relay region 60a returns to the high pressure equal to the pressure in the detection target region 30a.

In the first modified example, the pressure reducing valve 64 may be omitted. This is because, when the recovery control is not being executed, opening the upstream shut-off valve 62 and closing the downstream shut-off valve 63 can allow the pressure sensor 42 to detect the pressure in the detection target region 30a, and during the recovery control, closing the upstream shut-off valve 62 and opening the downstream shut-off valve 63 can depressurize the inside of the relay region 60a.

In the first modified example, the downstream shut-off valve 63 remains open during heating of the pressure sensor 42, but the downstream shut-off valve 63 may instead remain closed.

Figure 9:
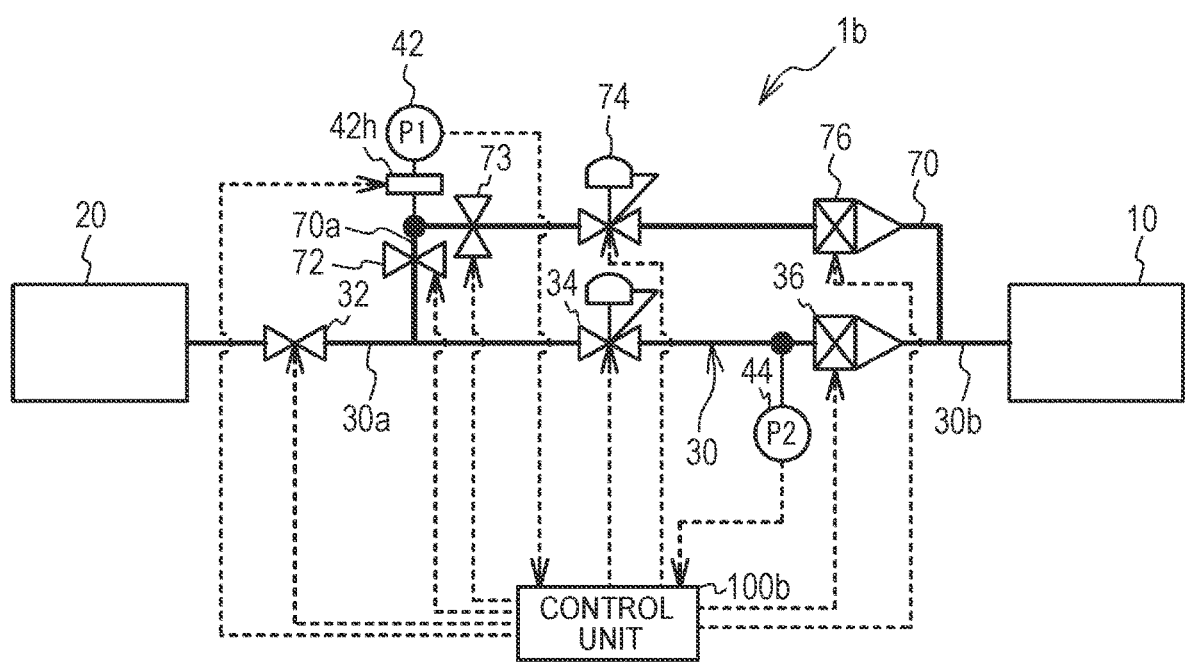
FIG. 9 is a view illustrating a fuel gas supply line of a fuel cell system in a second modified example.

FIG. 9 is a view illustrating a fuel gas supply line of a fuel cell system 1b in a second modified example. In the second modified example, the region of the supply passage 30 between the injector 36 and the fuel cell 10 will be referred to as a downstream region 30b. The fuel cell system 1b includes a bypass passage 70, an upstream shut-off valve 72, a downstream shut-off valve 73, a pressure reducing valve 74, and an injector 76. The bypass passage 70 communicates at one end with the detection target region 30a and at the other end with the downstream region 30b. The upstream shut-off valve 72, the downstream shut-off valve 73, the pressure reducing valve 74, and the injector 76 are provided in the bypass passage 70, in order of the upstream shut-off valve 72, the downstream shut-off valve 73, the pressure reducing valve 74, the injector 76, in the direction from the upstream side toward the downstream side. The pressure sensor 42 is provided in the bypass passage 70 between the upstream shut-off valve 72 and the downstream shut-off valve 73. In the second modified example, the region of the bypass passage 70 between the upstream shut-off valve 72 and the downstream shut-off valve 73 will be referred to as a relay region 70a in which the pressure is detectable by the pressure sensor 42.

The upstream shut-off valve 72 and the downstream shut-off valve 73 are an example of the "switching mechanism" that switches between a first state in which the relay region 70a communicates with the detection target region 30a while isolated from the downstream region 30b and a second state in which the relay region 70a is isolated from the detection target region 30a while communicating with the downstream region 30b. Specifically, the first state is realized as the upstream shut-off valve 72 is opened and the downstream shut-off valve 73 is closed. The second state is realized as the upstream shut-off valve 72 is closed and the downstream shut-off valve 73 is opened. The pressure reducing valve 74 fully opens under a low pressure and half opens under a high pressure, and thus is open in both the first and second states.

In the second modified example, the fuel cell system is controlled to the first state when the recovery control is not being executed. Therefore, the pressure in the relay region 70a is equal to the pressure in the detection target region 30a, and the pressure sensor 42 can detect the pressure in the detection target region 30a through the relay region 70a. When the recovery control is not being executed, the downstream shut-off valve 73 is closed and the injector 76 is not operating. Thus, the fuel gas injected from the injector 36 is prevented from flowing back through the bypass passage 70.

Figure 10:
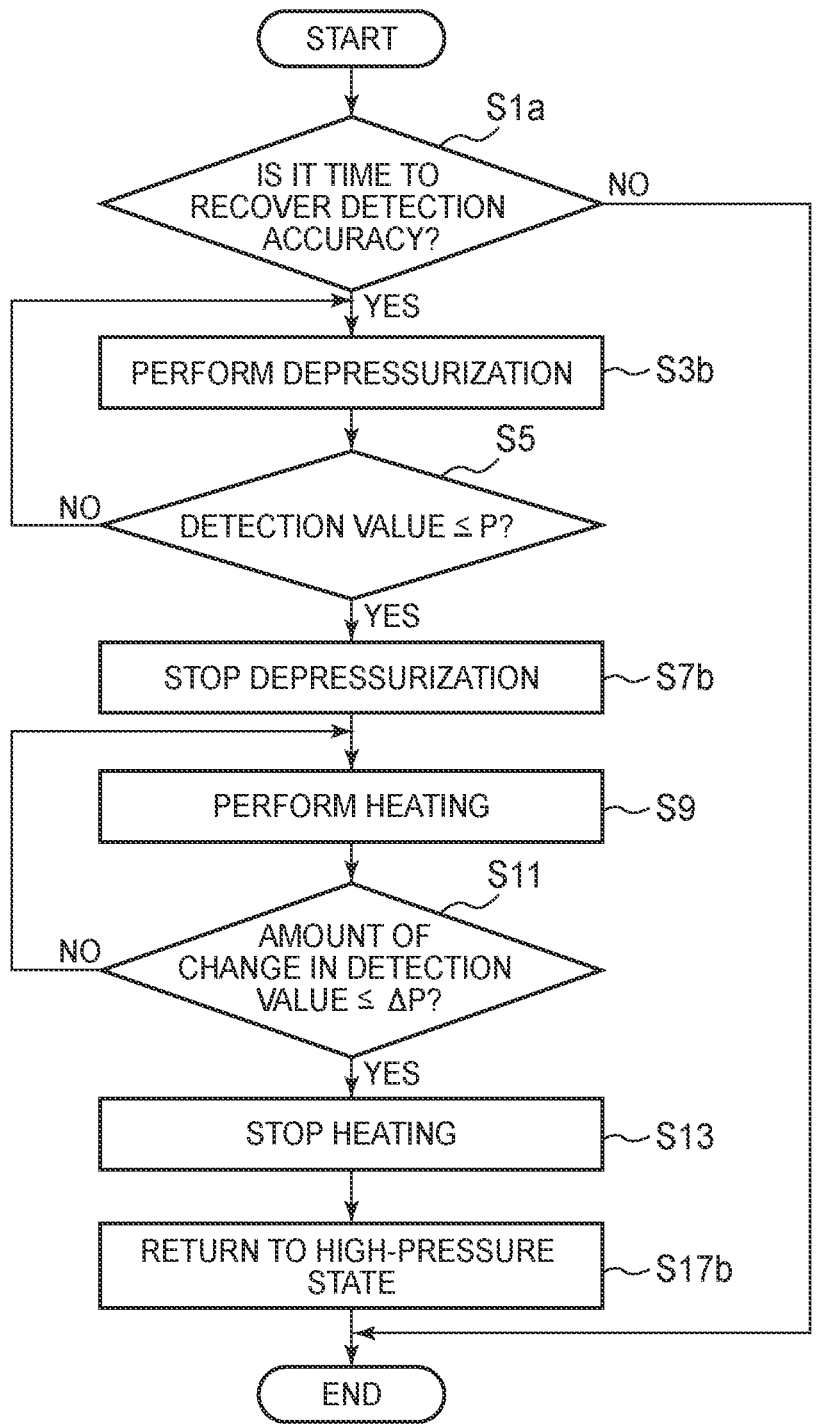
FIG. 10 is an example of a flowchart showing recovery control in the second modified example.

FIG. 10 is an example of a flowchart showing recovery control in the second modified example. A control unit 100b repeatedly executes this control in predetermined cycles. First, when step S1a is executed and the determination is affirmative in step S1a, the inside of the relay region 70a is depressurized (step S3b). Specifically, the upstream shut-off valve 72 is closed and the downstream shut-off valve 73 is opened, and the fuel gas is injected by the injector 76. Thus, the fuel gas inside the relay region 70a is supplied to the fuel cell 10 and the periphery of the pressure sensor 42 is depressurized, while the fuel gas discharged from the relay region 70a can be effectively used for electric power generation by the fuel cell 10. Moreover, as the upstream shut-off valve 72 is closed, the fuel gas can be continuously supplied from the tank 20 to the fuel cell 10 through the supply passage 30.

Next, when the determination in step S5 is affirmative, depressurization is stopped (step S7b) as in the above embodiment. Specifically, the pressure reducing valve 74 is fully opened. Next, the processes in steps S9 to S13 are executed as in the above embodiment. When the process in step S13 is executed, the fuel cell system is switched to the first state, so that the pressure in the relay region 70a becomes equal to the pressure in the detection target region 30a, and the pressure in the relay region 70a is returned to the pre-depressurization high pressure (step S17b).

Figure 11:
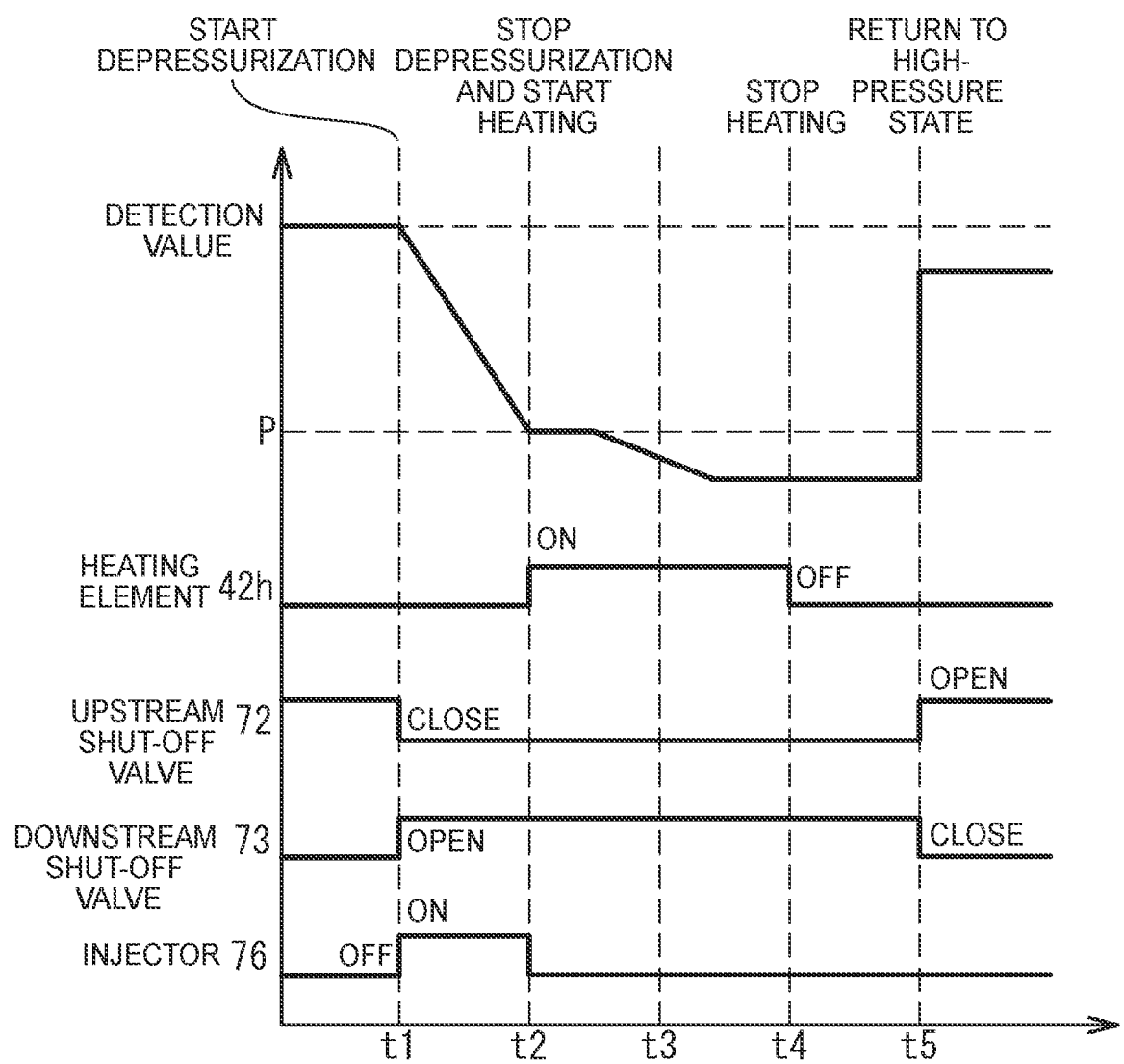
FIG. 11 is an example of a timing chart showing the recovery control in the second modified example.

FIG. 11 is an example of a timing chart showing the recovery control in the second modified example. When the recovery request flag is turned on, at time t1, the upstream shut-off valve 72 is closed and the downstream shut-off valve 73 is opened, and the fuel gas is injected by the injector 76 through the pressure reducing valve 74 to start depressurization. At time t2, when the detection value of the pressure sensor 42 decreases to or below the threshold value P, depressurization is stopped and heating of the pressure sensor 42 is started. Thus, at time t3, the amount of change in the detection value of the pressure sensor 42 fluctuates and becomes unstable. When the amount of change in the detection value of the pressure sensor 42 decreases to or below the threshold value ΔP at time t4, heating of the pressure sensor 42 is stopped. Then, at time t5, the upstream shut-off valve 72 is opened and the downstream shut-off valve 73 is closed, so that the pressure in the relay region 70a returns to the high pressure equal to the pressure in the detection target region 30a.

Thus, in the second modified example, it is possible to effectively use the fuel gas by being able to execute the recovery control of the pressure sensor 42 even while the fuel gas is continuously supplied from the tank 20 to the fuel cell 10.

Figure 12A:
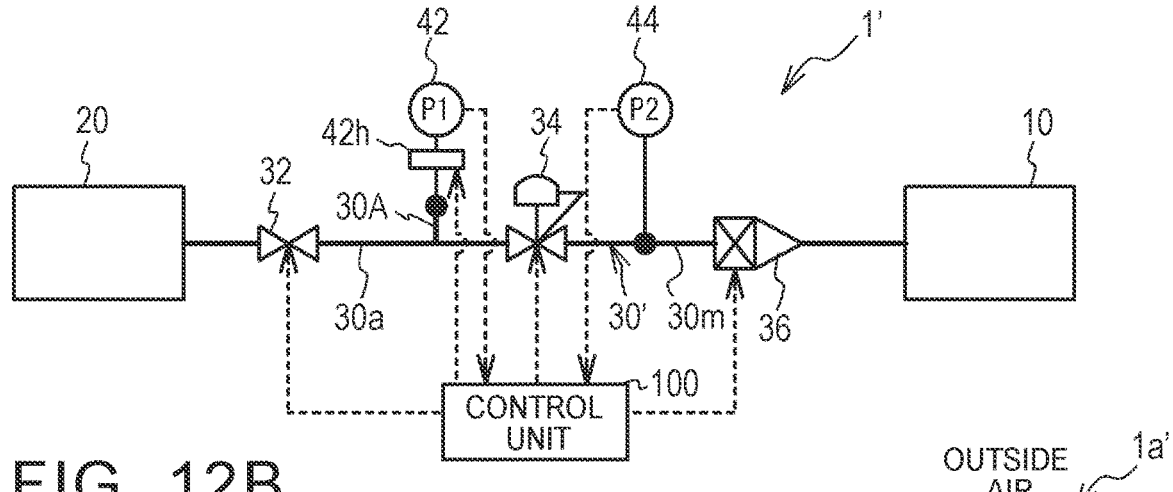
FIG. 12A is a view illustrating a fuel gas supply line of a fuel cell system in a third modified example.

FIG. 12A is a view illustrating a fuel gas supply line of a fuel cell system 1' in a third modified example. The configuration of the third modified example is similar to that of the above embodiment, but is different in that a supply passage 30' is provided instead of the supply passage 30. The supply passage 30' has a main passage 30m through which the fuel gas is supplied from the tank 20 to the fuel cell 10 and in which the main stop valve 32, the pressure reducing valve 34, and the injector 36 are disposed as described above, and a branch passage 30A which branches from the main passage 30*m* and of which an end is closed. The pressure sensor 42 is provided in the branch passage 30A, not in the detection target region 30*a*. In this configuration, too, the pressure sensor 42 can detect the pressure in the detection target region 30*a* through the branch passage 30A. The detection accuracy of the pressure sensor 42 can be recovered by the same technique as in the above embodiment.

Figure 12B:
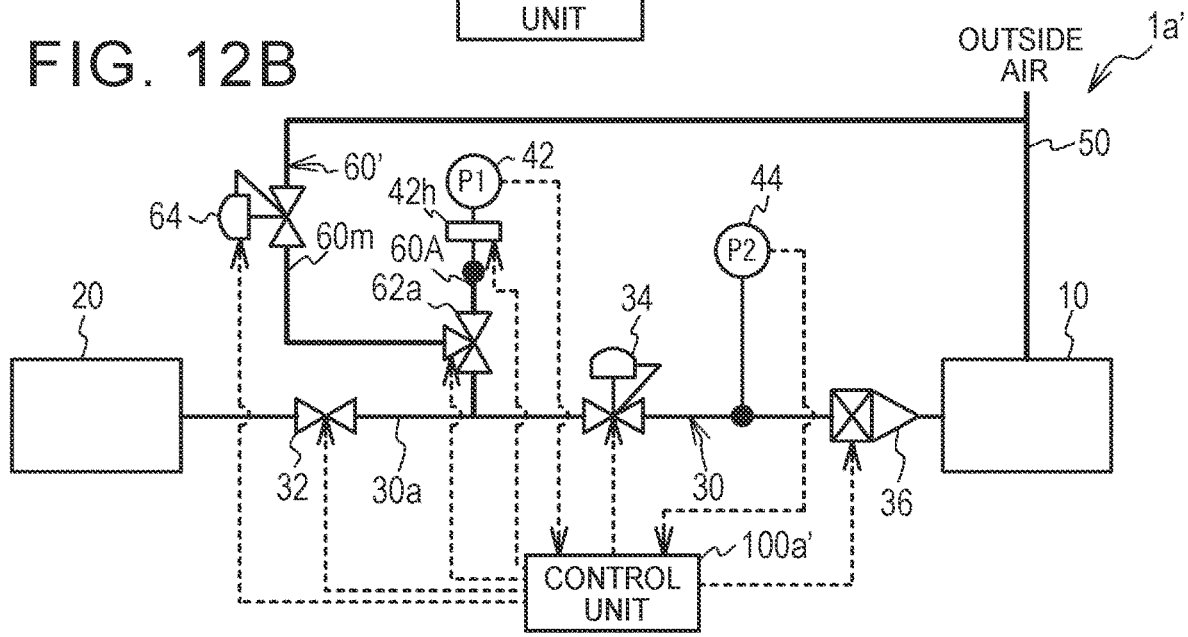
FIG. 12B is a view illustrating a fuel gas supply line of a fuel cell system in a fourth modified example.

FIG. 12B is a view illustrating a fuel gas supply line of a fuel cell system 1*a*' in a fourth modified example. The configuration of the fourth modified example is similar to that of the first modified example described above, but is different in that a three-way valve 62*a* is provided instead of the upstream shut-off valve 62 and the downstream shut-off valve 63, and that a bypass passage 60' is provided instead of the bypass passage 60. The bypass passage 60' has a main passage 60*m* which provides communication between the detection target region 30*a* and the outside air and in which the pressure reducing valve 64 is disposed as described above, and a branch passage 60A which branches at a point in the main passage 60*m* farther on the upstream side than the pressure reducing valve 64 and of which the other end is closed. The pressure sensor 42 is provided in the branch passage 60A and detects the pressure in the branch passage 60A. The three-way valve 62*a* is provided at the point at which the branch passage 60A branches from the main passage 60*m*. The three-way valve 62*a* is controlled by a control unit 100*a*'.

The three-way valve 62*a* is an example of the "switching mechanism" that switches between a first state in which the branch passage 60A communicates with the detection target region 30*a* while isolated from the outside air and a second state in which the branch passage 60A is isolated from the detection target region 30*a* while communicating with the outside air. Specifically, the first state is realized as the three-way valve 62*a* provides communication only between the branch passage 60A and the region of the main passage 60*m* on the upstream side from the three-way valve 62*a*, and isolates the region of the main passage 60*m* on the downstream side from the three-way valve 62*a* from this upstream-side region and the branch passage 60A. The second state is realized as the three-way valve 62*a* provides communication only between the branch passage 60A and the region of the main passage 60*m* on the downstream side from the three-way valve 62*a*, and isolates the region of the main passage 60*m* on the upstream side from the three-way valve 62*a* from this downstream-side region and the branch passage 60A.

In the fourth modified example, too, the fuel cell system is controlled to the first state when the recovery control is not being executed. In the first state, the branch passage 60A and the detection target region 30*a* communicate with each other through the region of the main passage 60*m* on the upstream side from the three-way valve 62*a*, so that the pressure in the branch passage 60A is equal to the pressure in the detection target region 30*a*. Thus, the pressure sensor 42 can detect the pressure in the detection target region 30*a* through the branch passage 60A etc.

In the recovery control, the fuel cell system is switched to the second state. Therefore, the fuel gas in the branch passage 60A is discharged into the outside air through the main passage 60*m* in a state in which the detection target region 30*a* and the branch passage 60A are isolated from each other. Thus, the inside of the branch passage 60A is depressurized. In this configuration, too, the periphery of the pressure sensor 42 can be depressurized.

Figure 12C:
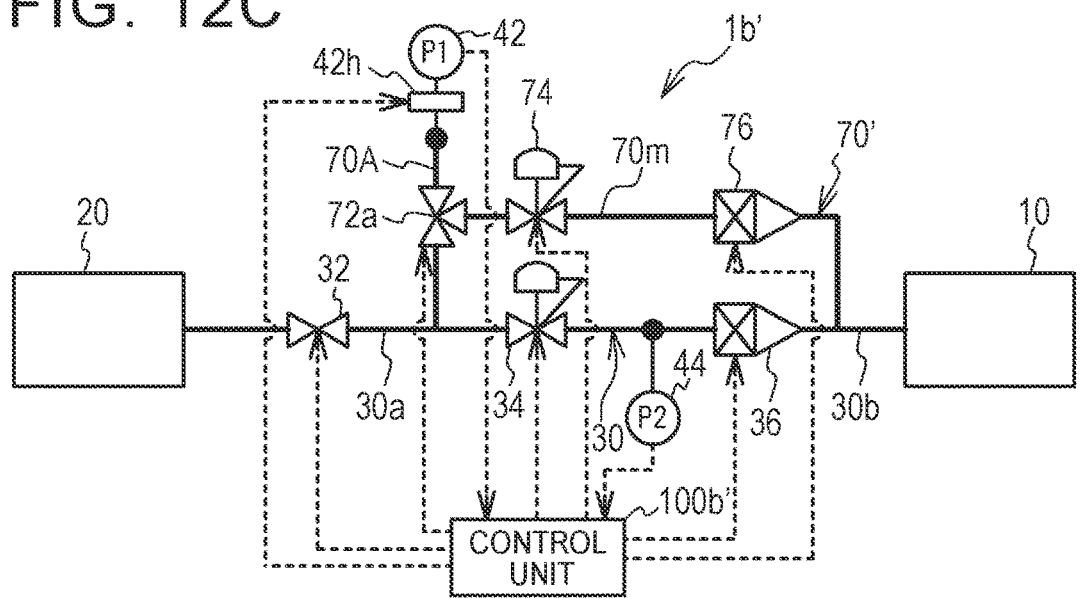
FIG. 12C is a view illustrating a fuel gas supply line of a fuel cell system in a fifth modified example.

FIG. 12C is a view illustrating a fuel gas supply line of a fuel cell system 1*b*' in a fifth modified example. The configuration of the fifth modified example is similar to that of the second modified example described above, but is different in that a three-way valve 72*a* is provided instead of the upstream shut-off valve 72 and the downstream shut-off valve 73, and that a bypass passage 70' is provided instead of the bypass passage 70. The bypass passage 70' has a main passage 70*m* which provides communication between the detection target region 30*a* and the downstream region 30*b* and in which the pressure reducing valve 74 and the injector 76 are provided as described above, and a branch passage 70A which branches at a point in the main passage 70*m* farther on the upstream side than the pressure reducing valve 74 and of which the other end is closed. The pressure sensor 42 is provided in the branch passage 70A and detects the pressure in the branch passage 70A. The three-way valve 72*a* is provided at the point at which the branch passage 70A branches from the main passage 70*m*. The three-way valve 72*a* is controlled by a control unit 100*b*'.

The three-way valve 72*a* is an example of the "switching mechanism" that switches between a first state in which the branch passage 70A communicates with the detection target region 30*a* while isolated from the downstream region 30*b* and a second state in which the branch passage 70A is isolated from the detection target region 30*a* while communicating with the downstream region 30*b*. Specifically, the first state is realized as the three-way valve 72*a* provides communication only between the branch passage 70A and the region of the main passage 70*m* on the upstream side from the three-way valve 72*a*, and isolates the region of the main passage 70*m* on the downstream side from the three-way valve 72*a* from this upstream-side region and the branch passage 70A. The second state is realized as the three-way valve 72*a* provides communication only between the branch passage 70A and the region of the main passage 70*m* on the downstream side from the three-way valve 72*a*, and isolates the region of the main passage 70*m* on the upstream side from the three-way valve 72*a* from this downstream-side region and the branch passage 70A.

In the fifth modified example, too, the fuel cell system is controlled to the first state when the recovery control is not being executed. In the first state, the branch passage 70A and the detection target region 30*a* communicate with each other through the region of the main passage 70*m* on the upstream side from the three-way valve 72*a*, so that the pressure in the branch passage 70A is equal to the pressure in the detection target region 30*a*. Thus, the pressure sensor 42 can detect the pressure in the detection target region 30*a* through the branch passage 70A etc.

In the recovery control, the fuel cell system is switched to the second state, and the fuel is injected by the injector 76. Therefore, the fuel gas in the branch passage 70A is supplied to the fuel cell 10 in a state in which the detection target region 30*a* and the branch passage 70A are isolated from each other. Thus, the inside of the branch passage 70A is depressurized. In this configuration, too, the periphery of the pressure sensor 42 can be depressurized.

While the embodiment of the present disclosure has been described above in detail, the present disclosure is not limited to this specific embodiment, and various modifications and changes can be made thereto within the scope of the gist of the disclosure described in the claims.

The pressure sensor 42 is not limited to the above-described pressure sensor that is based on the resistance of the strain gauge, and may be any pressure sensor that is made of a metal material in which components of the fuel gas can be solid-solved and that exhibits increased detection error due to solid solution. For example, the pressure sensor 42 may be any one of a semiconductor piezoresistive pressure sensor, electrical capacitance pressure sensor, and silicon resonant pressure sensor.

In the above embodiment and modified examples, the heating element 42h is provided inside the pressure sensor 42, but the present disclosure is not limited to this configuration. For example, a heating unit may be disposed on an outside of the pressure sensor 42, and the metal material of the pressure sensor 42 may be heated from the outside of the pressure sensor 42.

What is claimed is:

1. A fuel cell system, comprising:
   a fuel cell;
   a tank configured to store a fuel gas;
   a supply passage configured so that the fuel gas is supplied through the supply passage from the tank to the fuel cell;
   a first valve configured to open and close the supply passage;
   a second valve configured to open and close the supply passage, the first valve and the second valve being provided in order of the first valve, the second valve in a direction from an upstream side of the supply passage toward a downstream side of the supply passage;
   a bypass passage that branches from a detection target region between the first valve and the second valve of the supply passage, and is connected with an exhaust passage that communicates with outside air;
   a third valve configured to open and close the bypass passage and a fourth valve configured to open and close the bypass passage, wherein
   the third valve and the fourth valve are provided at an upstream side of the bypass passage and a downstream side of the bypass passage in this order,
   a region between the third valve and the fourth valve has a relay region and
   the third valve is configured to switch between a first state in which the third valve is opened such that the relay region communicates with the detection target region while isolated from the outside air and a second state in which the third valve is closed such that the relay region is isolated from the detection target region while communicating with the outside air;
   a pressure sensor configured to detect a pressure in the relay region;
   a heating unit configured to heat the pressure sensor; and
   a controller configured to make the heating unit heat the pressure sensor in a state in which a detection value of the pressure sensor is not larger than a pressure threshold value when the fuel gas is supplied to the fuel cell, wherein
   the pressure sensor is configured to detect a pressure in the detection target region through the relay region, and
   the controller is configured to make the heating unit heat the pressure sensor in a state in which the detection value is not larger than the pressure threshold value and the fuel cell system is in the second state.

2. A fuel cell system comprising:
   a fuel cell;
   a tank configured to store a fuel gas;
   a supply passage configured so that the fuel gas is supplied through the supply passage from the tank to the fuel cell;
   a first valve configured to open and close the supply passage;
   a second valve configured to open and close the supply passage, the first valve and the second valve being provided in an order of the first valve and the second valve in a direction from an upstream side toward a downstream side of the supply passage;
   a bypass passage that branches from a detection target region between the first valve and the second valve of the supply passage, and communicates with a downstream region of the supply passage located farther on the downstream side of the supply passage than the second valve;
   a fifth valve configured to open and close the bypass passage and a sixth valve configured to open and close the bypass passage, wherein
   the fifth valve and the sixth valve are provided at an upstream side of the bypass passage to a downstream side of the bypass passage in this order,
   a region between the fifth valve and the sixth valve has a relay region, and
   the fifth valve is configured to switch between a third state in which the fifth valve is opened such that the relay region communicates with the detection target region while isolated from the downstream region, and a fourth state in which the fifth valve is closed such that the relay region is isolated from the detection target region while communicating with the downstream region;
   a pressure sensor configured to detect a pressure in the relay region;
   a heating unit configured to heat the pressure sensor; and
   a controller configured to make the heating unit heat the pressure sensor in a state in which a detection value of the pressure sensor is not larger than a pressure threshold value when the fuel gas is supplied to the fuel cell, wherein
   the pressure sensor is configured to detect a pressure in the detection target region through the relay region, and
   the controller is configured to make the heating unit heat the pressure sensor in a state in which the detection value is not larger than the pressure threshold value and the fuel cell system is in the fourth state.

3. The fuel cell system according to claim 2, further comprising:
   an injector provided in the bypass passage, farther on the downstream side of the bypass passage than the fifth valve, and configured to inject the fuel gas to the downstream side of the bypass passage, wherein
   the controller is configured to control the detection value so as not to be larger than the pressure threshold value by making the injector inject the fuel gas in the fourth state.

* * * * *